F. W. HOWE.
PRESERVING MILK.
APPLICATION FILED SEPT. 23, 1907.
1,000,409.
Patented Aug. 15, 1911.
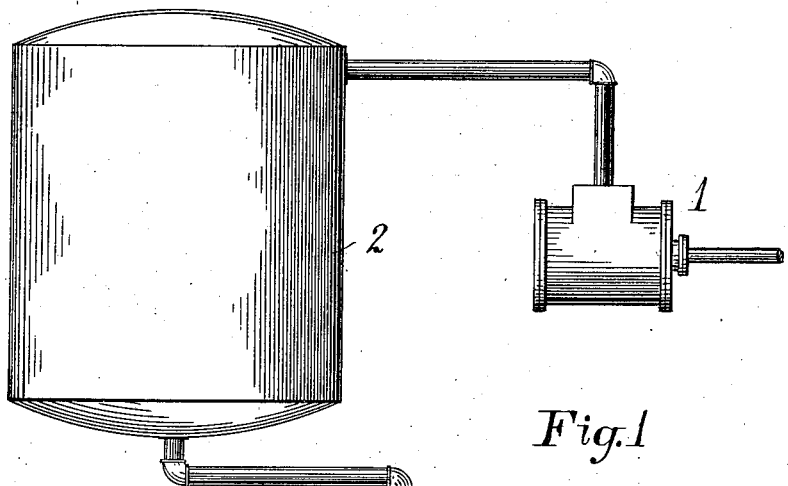
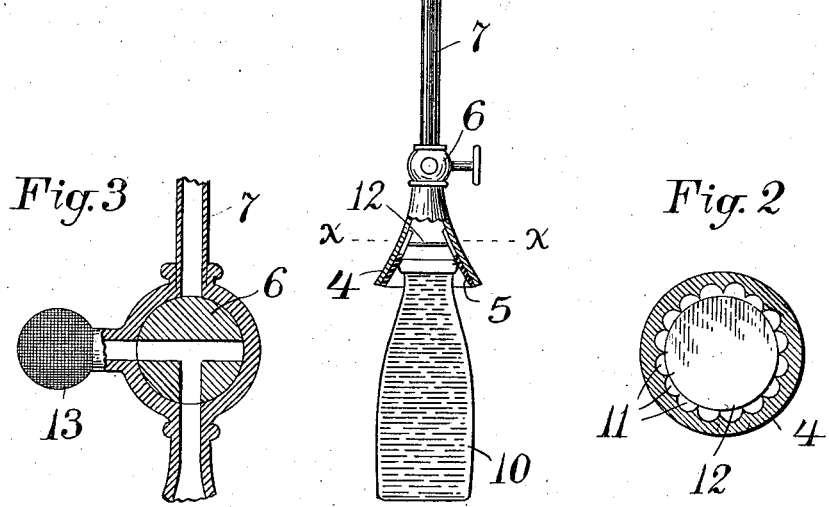
Witnesses;
Inventor,
Frederic W. Howe;
By A. B. Upham,
Attorney.

UNITED STATES PATENT OFFICE.

FREDERIC W. HOWE, OF FRAMINGHAM, MASSACHUSETTS.

PRESERVING MILK.

1,000,409.　　Specification of Letters Patent.　Patented Aug. 15, 1911.

Application filed September 23, 1907. Serial No. 394,039.

*To all whom it may concern:*

Be it known that I, FREDERIC W. HOWE, a citizen of the United States, residing at Framingham, in the county of Middlesex and Commonwealth of Massachusetts, have invented a certain new and useful Improvement in Preserving Milk, of which the following is a specification.

In the distribution of milk to consumers, it is essential to first thoroughly refrigerate the same in an attempt to remove the animal heat, in order to retard bacteriological alteration therein as long as possible. In my position as chemical expert for a great milk receiving and distributing concern, I have had ample opportunity to observe the inefficiency of the present method of cooling by means of ice. After considerable study and experiment upon this subject, I finally conceived of the possibility of cooling the milk by subjecting the same to a vacuum. In further experiment, I not only found that such subjection to a vacuum proved a success in refrigerating the milk and thoroughly removing all animal heat, but in addition it served to remove all noxious and odoriferous gases present in the milk, and further, killed the larger part of the bacteria therein.

The object of this invention is, therefore, for preserving, purifying and cooling milk.

In carrying this process into effect, I have devised the apparatus shown in the accompanying drawings, in which—

Figure 1 is an elevation, partially in section, illustrating the same. Fig. 2 is an enlarged horizontal section on the line X—X in Fig. 1. Fig. 3 is a cross section of the three-way valve which I prefer to use.

The apparatus shown is arranged for the treatment of milk after being put in the usual milk-jar, but the process is equally applicable to milk in any other styles of containers. It is on many accounts preferable to employ the process upon the milk after it is placed in the can, jar or other container in which it is to be delivered to the consumer, in order that there may be no further opportunity for its contamination.

For the production of the vacuum, any ordinary form of vacuum pump may be employed, as the pump 1 shown in Fig. 1; and an air-tight chamber 2 may be used, from which the pump is constantly withdrawing the air and vapor. Connected with said chamber is a bell-mouthed member 4, having its inner surface covered with a soft rubber lining 5. By pressing the open mouth of the jar or can 10 up within said bell-mouthed member, into intimate contact with the rubber lining 5, and then turning the valve 6 to open the connecting pipe 7, the milk within said can or jar is subjected to the vacuum maintained in said chamber. Thus subjected to the vacuum, the milk rapidly gives off watery vapor to a sufficient extent to soon cool it to the required degree,—preferably about 38 degrees F. At the same time the gases within the milk also escape; the bacteriological germs are largely killed, and the milk is left in a condition of coolness and purity which will insure its keeping sweet and pure for several days. The valve 6 is then shut, to turn off the suction; the jar is removed, and its cover or other sealing device applied. During this part of the work, however, more or less air reaches the surface of the milk, and to a limited degree re-contaminates it. To prevent this, I serrate the throat of the bell-mouthed member at a suitable distance above the section reached by the mouth of the jar 10, as shown in Fig. 2, and insert the paper disk 12 usually used for sealing jars of this kind. As this disk is applied with one hand, the valve 6 is given a partial turn, enough to retain the disk in place by suction, and then the glass jar is applied as shown in Fig. 1. Then the valve is opened wide; the watery vapor and gases pass from the milk through the spaces between the disk and serrations 11, until the milk is sufficiently treated; and finally the valve 6 is turned to another angle to shut off the vacuum-pipe 7, and admit the atmosphere through the valve. By having the same a three-way valve, as shown in Fig. 3, this is easily done. The atmosphere being thus admitted to the space above the paper disk, the latter is instantly forced down into the mouth of the jar in its sealing position. The jar of milk is then ready at once for shipment. It is well to thus use a three-way valve even if no seal is to be applied through its means, in order that the vacuum shall not interfere with the jar's removal. If desired, the intake 13 of said valve may be suitably screened to prevent any access of contaminating germs to the milk when being sealed as above.

By means of this process, the milk, whether in a jar, can or other receptacle, is simultaneously cooled, purified and made capable of lengthy preservation in but a moment of time and at a merely nominal expense.

What I claim as my invention and for which I desire Letters Patent is as follows, to wit;—

The herein described method of preparing milk for delivery to customers, which consists in filling the container which is to be shipped to the consumer, with milk freshly drawn from the cow, connecting a vacuum producing device with the container until the gases and animal heat have been eradicated from such milk, and then applying a permanent seal to the mouth of the container without the access of atmospheric air.

In testimony that I claim the foregoing invention, I have hereunto set my hand this 19th day of September, 1907.

FREDERIC W. HOWE.

Witnesses:
A. B. UPHAM,
BURTON PAYNE GRAY.